United States Patent
Yeo et al.

(12)
(10) Patent No.: US 6,295,182 B1
(45) Date of Patent: Sep. 25, 2001

(54) DISC CARTRIDGE

(75) Inventors: Woon-Sung Yeo; Chang-Jong Kim, both of Chungcheongbukdo (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/203,366

(22) Filed: Dec. 2, 1998

(30) Foreign Application Priority Data

Dec. 2, 1997 (KR) .................................................. 97-65225

(51) Int. Cl.[7] .......................... G11B 23/03; G11B 23/033
(52) U.S. Cl. .......................................................... 360/133
(58) Field of Search .......................... 369/291; 360/133; 206/308.1, 308.3

(56) References Cited

U.S. PATENT DOCUMENTS

| | | | |
|---|---|---|---|
| 3,833,926 | * | 9/1974 | Hall ........................................ 360/135 |
| 3,947,893 | * | 3/1976 | Hall, Sr. ................................ 360/133 |
| 4,885,652 | * | 12/1989 | Leonard et al. ....................... 360/133 |
| 4,918,559 | * | 4/1990 | Maruyama et al. ................... 360/133 |

FOREIGN PATENT DOCUMENTS

| | | | |
|---|---|---|---|
| 59-019280 | * | 1/1984 | (JP) . |
| 5-101588 | * | 4/1993 | (JP) . |
| 8-83477 | * | 3/1996 | (JP) . |
| 8-87853 | * | 4/1996 | (JP) . |

\* cited by examiner

Primary Examiner—William Klimowicz

(57) ABSTRACT

A cartridge for reducing air resistance therein which is induced by the rotation of a disc-shaped storage medium housed in the cartridge. Air resistance is reduced by forming holes and/or grooves on a housing case through which air flows in and out spontaneously.

2 Claims, 4 Drawing Sheets

FIG. 1
CONVENTIONAL ART
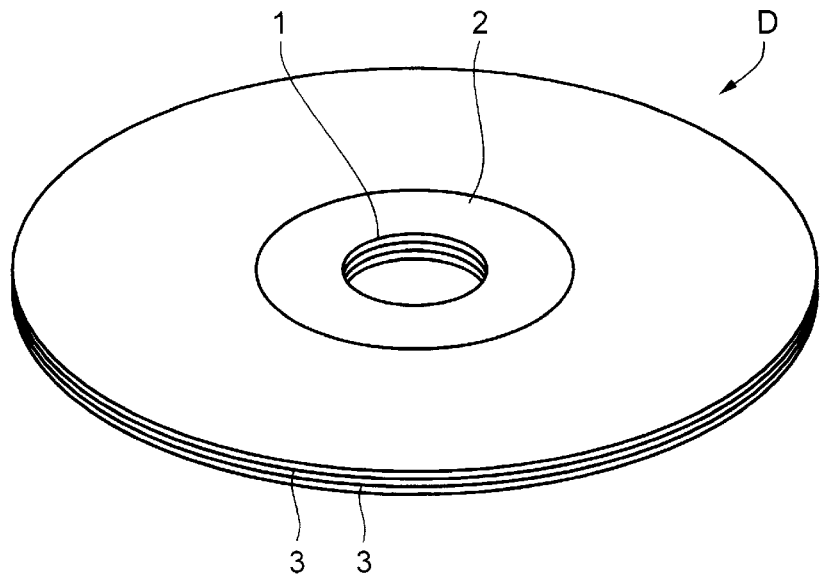
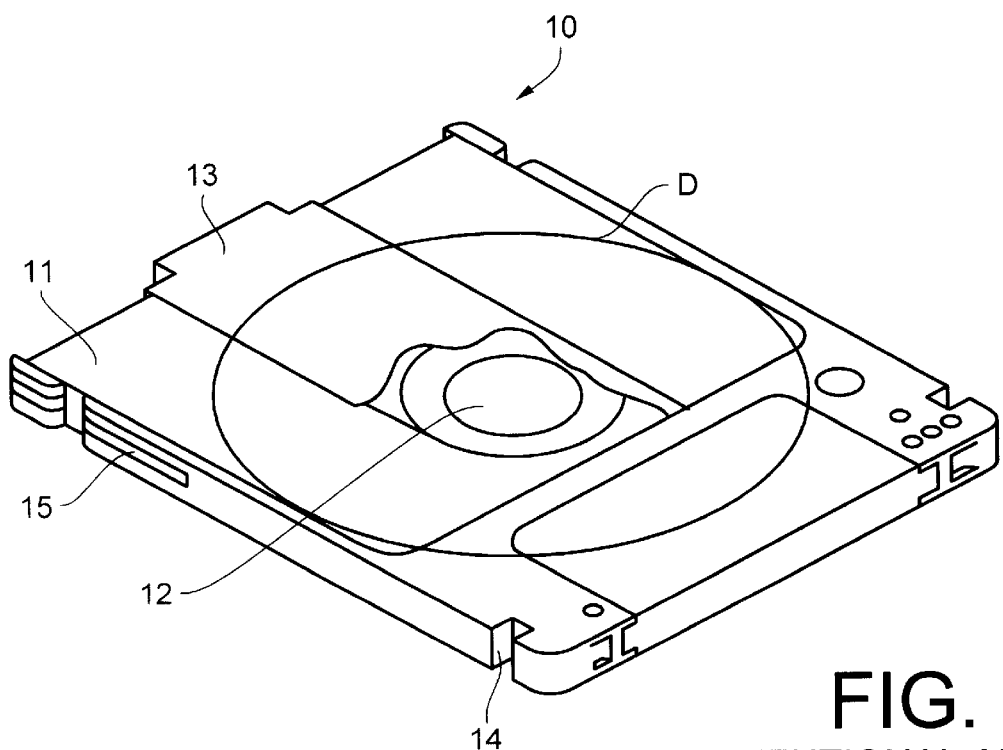
FIG. 2
CONVENTIONAL ART

DISC CARTRIDGE

BACKGROUND OF THE INVENTION

1. Field of the Invention

The present invention relates generally to disc cartridges, more particularly, to a disc cartridge for keeping a disc-shaped storage medium therein and significantly reducing air resistance therein which is generated by the rotation of the disc-shaped storage medium when the disc cartridge housing disc-shaped storage medium is in operation.

2. Brief Description of the Related Art

There exist two types of disc-shaped storage mediums: One is a storage medium housed in a disc cartridge that is recorded/reproduced in that state. The other is a storage medium that is used without a disc cartridge, like a disc-shaped storage medium shown in FIG. 1. Examples of disc-shaped storage mediums of the latter are CD-DA, CD-R, CD-RW and DVD. The disc D of FIG. 1 has a center hole 1 punched thereon and a clamping area 2 that is formed around the center hole 1. Digital information of audio and video is recorded on a data recording area 3 on one side of poly-Carbonate substrate of 1.2 mm in thickness, and on the other side, information about the disc, e.g., figures or characters are printed.

When the disc D is inserted in a disc driving unit, the disc Disclamped by a clamper 6 around the clamping area 2 of the disc D and then starts to rotate. It is in the interior of the disc driving unit 5 that the disc D rotates.

FIG. 2 shows a disc cartridge 10 for keeping a disc-shaped storage medium therein in such a way that the disc-shaped storage medium is recorded/reproduced in that state. The disc cartridge comprises the interior 11S (shown in FIG. 4) of a housing case 11, where a disc D is kept and rotated; a spindle window 12 which fits with a rotatable spindle (not shown) of a disc driving unit 16 (shown in FIG. 4) and is formed in the center of the housing case 11; a shutter 13 which is slidably attached on one side of the housing case 11 to open and/or close the opening portion of the housing case 11; a gripping slot 14; and an insertion slot 15. The disc D is typically double-sided, i.e., both sides of the disc are used to store digital information.

In order to reproduce the disc D, the disc cartridge 10 keeping the disc D therein is loaded onto a recording/reproducing apparatus. At that time, the shutter 13 is moved so that a pickup (not shown) can read/write information from/to the disc D. It is in the interior 11S of the disc cartridge 10 that the disc D rotates.

The recent trend on high record/reproduction rate of disc-shaped storage mediums demands the increase of the rotational speed of the disc-shaped storage mediums. However, in the case of the disc D housed in the disc cartridge 10, the maximum rotational speed or the speed limit ensuring the stable read/write operation is typically lower than that of the disc requiring no cartridge. This is due to the difference of space in which the disc rotates in normal operation.

Whereas discs requiring no cartridge rotate with a spacing of 10.5 mm from the top and the bottom of the driving unit, as shown in FIG. 3, the discs housed in the housing case in the interior of the case, with a spacing of 4.4 mm from the top and the bottom of the case, as shown in FIG. 4.

Hence, an air flow which is induced by the rotation of the disc D causes the air resistance by which the rotation of the disc in the interior 11S is disturbed. Due to the induced air resistance in the housing case, the maximum operational rotational speed of the disc D in the cartridge 10 is limited to a lower rotational speed than that of the disc of FIG. 1.

To be specific, a high rotational speed of the disc D is not achieved at the initial driving phase because of the air resistance induced by air flows in the interior 11S of the cartridge 10, and thus there are difficulties in achieving a desired high rotational speed of the disc in a desired short period of time. Changing the rotational speed of the disc in operation for maintenance of a constant linear velocity is also disturbed by the air resistance. Moreover, the air resistance may cause disturbance in the rotation of the disc D, resulting in the generation of vibration and noise thereby.

SUMMARY OF THE INVENTION

A general objective of the present invention is to solve the above mentioned problems and to provide a disc cartridge for a disc-shaped storage medium which are capable of reducing the air resistance, which is generated by a high rotational speed of the disc-shaped storage medium in the interior of the disc cartridge, through means for controlling air flow in the interior of the disc cartridge.

The disc cartridge according to the present invention comprises a housing case for keeping a disc-shaped storage medium therein in a manner that the disc-shaped storage medium can rotate in that state, and a means, which is arranged on the housing case, for reducing the air resistance in the interior of the housing case which disturbs the rotation of the disc-shaped storage medium.

The air resistance reduction means comprises holes punched on, the housing case and/or grooves formed in the inner surfaces of the housing case.

The disc cartridge configured as above according to the present invention enables to reduce the vibration and noise thereby, which are caused by the air resistance, by allowing air in the interior of the housing case to flow in and out spontaneously. Moreover, the present invention enables the increase of the operational rotational speed of the disc-shaped storage medium housed in the disc cartridge.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings:

FIG. 1 is a perspective view of a disc-shaped storage medium;

FIG. 2 is a perspective view of a disc cartridge of the prior art;

DETAILED DESCRIPTION OF THE PREFERRED EMBODIMENTS

The preferred embodiments of the present invention will be described in detail referring to the accompanying drawings.

Figure 3:
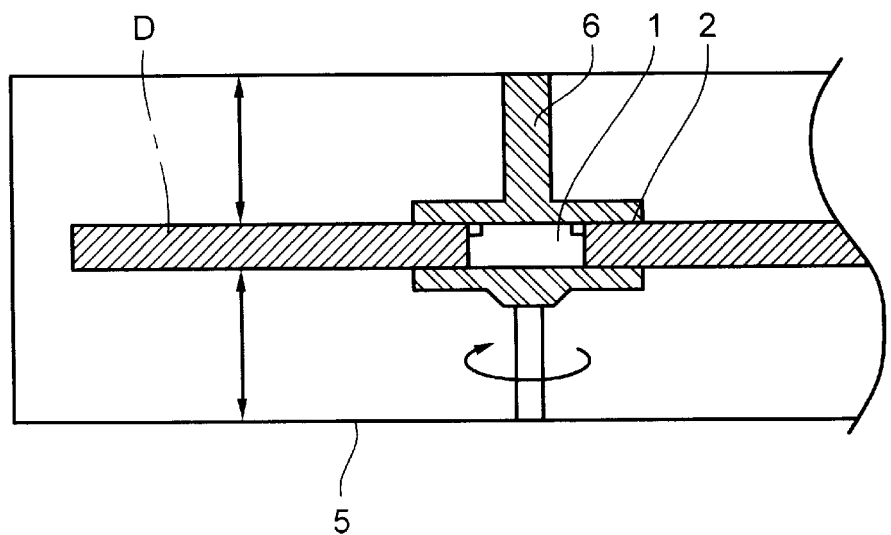
FIG. 3 is a cross-sectional view illustrating the disc-shaped storage medium of FIG. 1 in a disc driving unit.
Figure 4:
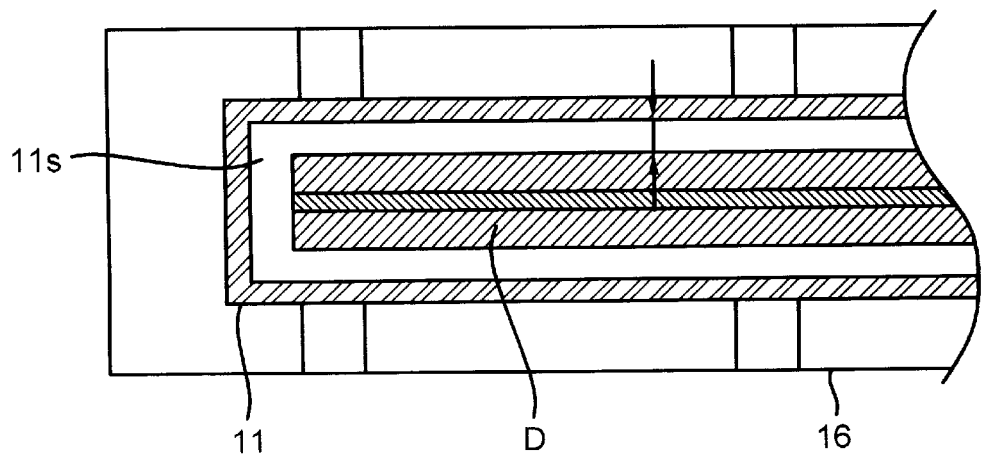
FIG. 4 is a cross-sectional view illustrating the disc cartridge of FIG. 2 in a disc driving unit.
Figure 5:
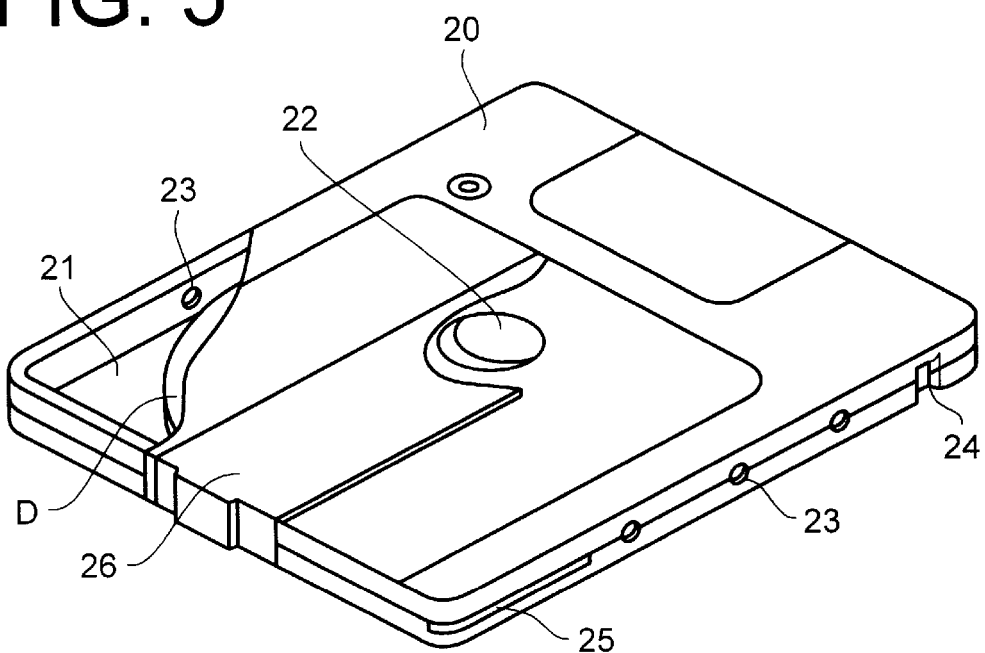
FIG. 5 is a perspective view of a first embodiment of the disc cartridge cut out partly.

FIG. 5 is a perspective view of a first preferred embodiment of the disc cartridge according to the present invention. A disc D is housed in the housing case 20 in a manner that it can rotate in that state. A spindle window 22 is formed in the center of the housing case which fits with a rotatable spindle of a disc driving unit, and a slidably movable shutter 26 is attached on one side of the housing case 20 for opening/closing the opening portion thereof.

A plurality of cylindrical holes are arranged on both side walls of the housing case 20 so that outer air flows into the case and the air in the housing case flows out through the holes when the disc D rotates. It is desirable that the diameter of the cylindrical holes 23 is chosen such that foreign matters outside are prohibited from being flowed in, but outer air flows in spontaneously through the holes.

The number of the cylindrical holes 23 is determined by a maximum rotational speed of the disc D. It is preferred that the required number of the cylindrical holes 23 is chosen based on the calculation of an amount of air flow per a unit of time through the holes which is required to obtain a stable rotational speed of the disc D.

Figure 6:
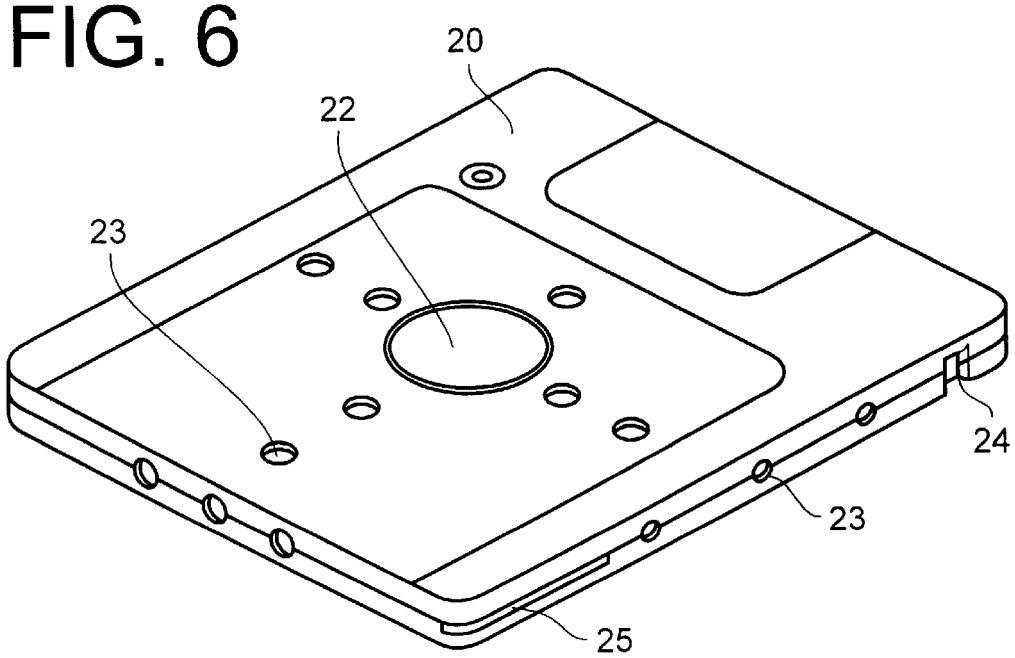
FIG. 6 is a perspective view of a second embodiment of the disc cartridge of this invention.

FIG. 6 depicts a perspective view of a second preferred embodiment of the disc cartridge according to the present invention. In the preferred embodiment, a plurality of cylindrical holes 23 are formed on the top and/or the bottom of the housing case 20. The number of the cylindrical holes are determined by calculation of the amount of air flow-in, as well.

Figure 7:
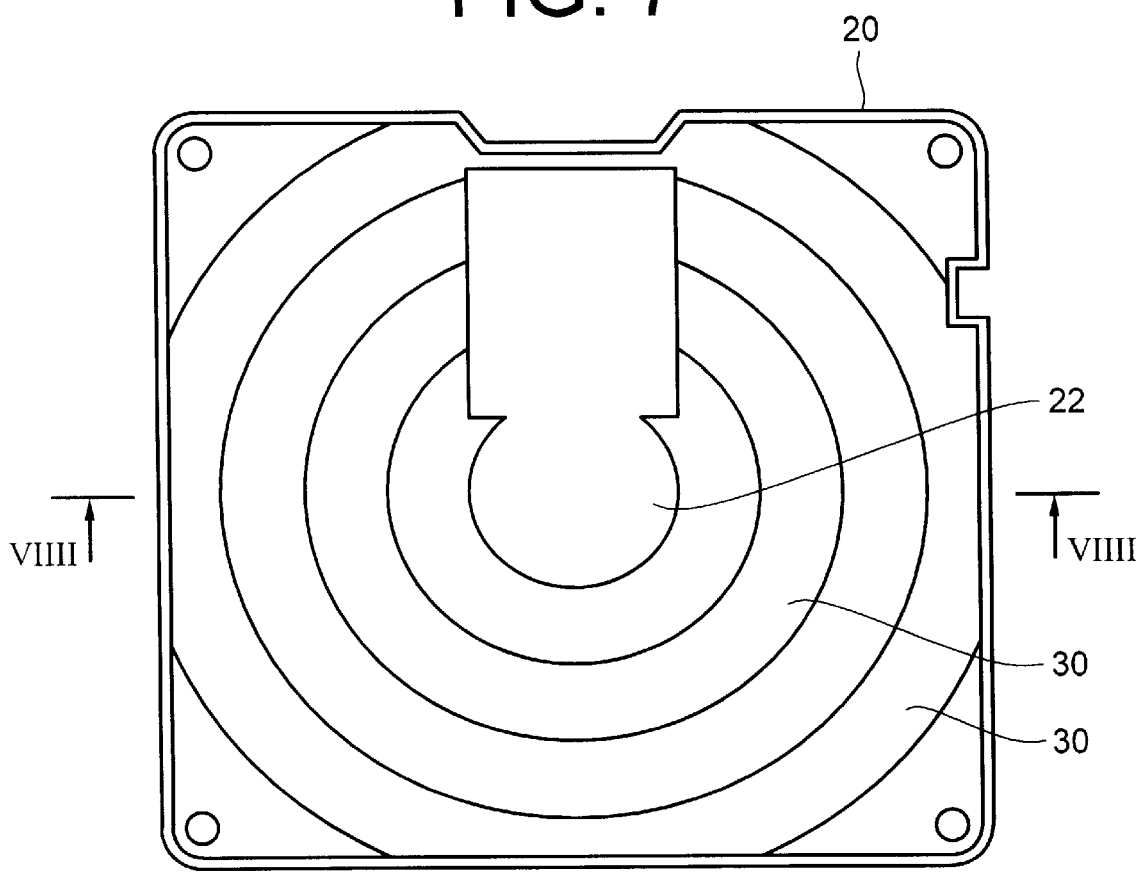
FIG. 7 is a plan view of the interior of a third embodiment of the disc cartridge of this invention.
Figure 8:
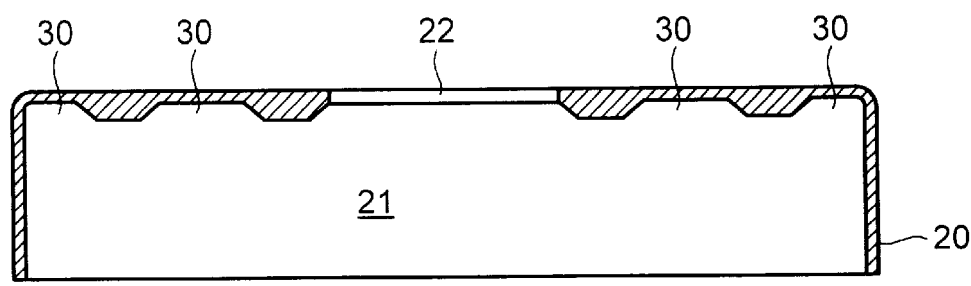
FIG. 8 is a cross-sectional view of the disc cartridge of FIG. 7, this view taken along line VIII–VIII of FIG. 7.

FIG. 7 shows a plan view of the interior of a third embodiment of the disc cartridge according to the present invention. In this embodiment, a plurality of grooves 30 are formed on the inner top and/or bottom surfaces of the housing case 20 in order to guide air flow therein.

The air-flow guiding grooves 30 are arranged on the inner top and/or bottom surfaces of the housing case in the form of concentric circles, the center of which coincides with the center of rotation of the disc D. The grooves can also be arranged in spiral shapes, centering around the center of the rotation of the disc D. It is desirable that the rotational direction of the spiral-shaped grooves 30 coincides with that of the disc D.

As another embodiment, both the holes 23 and grooves 30 can be formed on the housing case 30 so as to minimize the air resistance as much as possible.

The effect of the preferred embodiments of the present invention configured as above will be described in detail.

When the disc D starts to rotate in the interior 21 of the housing case 20 by a disc driving unit, an air flow is induced in the interior of the housing case. At that time, outer air enters into the housing case through the air-flow holes 23 and then flows out spontaneously through holes 23. As a result, the air resistance induced by the rotation of the disc D can be reduced significantly even when the disc D rotates in the housing case at a high rotational speed.

Moreover, the existence of the holes 23 makes it possible to achieve a high rotational speed rapidly at an initial driving phase. Specifically, when the disc cartridge is not in operation, the disc does not rotate, no air flow existing in the housing case. At the instant when the disc D starts to rotate at a high rotational speed, the air in the housing case begins to flow from the proximity of the disc D to the inner surfaces of the housing case. If there exist no holes on the housing case, the rotation of the disc is disturbed by the air flow which bounces back from the inner sides of the housing case. However, the air resistance is reduced significantly because air can flow in and out through the holes.

On the other hand, the grooves 30, which are formed on the inner sides of the housing case in the form of either concentric circles or spiral shapes, guide air flow generated by the rotation of the disc D. Due to the grooves, the air in the interior of the housing case flows uniformly either clockwise or counterclockwise, leading to the reduction of the air resistance by an eddy flow.

The grooves 30 are also effective in controlling the rotational speed of the disc D to maintain a constant linear velocity when the disc cartridge is in operation. To be more specific, in order for a pickup to read/write data from/to the disc D while moving along the radius direction of the disc D, a constant linear velocity must be maintained, i.e., the rotational speed of the disc D must change, depending on the radial position of the pickup. To accomplish this, a uniform uni-directional air flow in the housing case is required. The grooves 30 makes the uni-directional air flow be formed in the housing case and thus enables a rapid change of the rotational speed of the disc.

The foregoing is provided only for the purpose of illustration and explanation of the preferred embodiments of the present invention, so changes, variations and modifications may be made without departing from the spirit and scope of the invention.

What is claimed is:

1. A cartridge for a disc-shaped storage medium, comprising:

a housing case where the disc-shaped storage medium is kept in a manner that the disc-shaped storage medium can rotate therein, the housing case having an upper portion and a lower portion which are parallel to recording surface of the disc encased in the housing, and side walls perpendicular to and connecting the upper and lower portions; and means, formed on the housing case, to reduce an air resistance in the housing case, the reducing means being an inner surface of the housing case with grooves formed thereon to guide air flow in the housing case, the grooves being arranged on top and/or bottom of the housing case in concentric circles, a center of the concentric circles coinciding with a center of rotation of the disc-shaped storage medium, the reducing means further including the side walls with holes formed thereon to allow air to flow therethrough.

2. The cartridge according to claim 1, wherein the reducing means further includes holes formed on top and/or bottom of the housing case to allow air to flow in and out through the holes.

* * * * *